Patented Oct. 30, 1923.

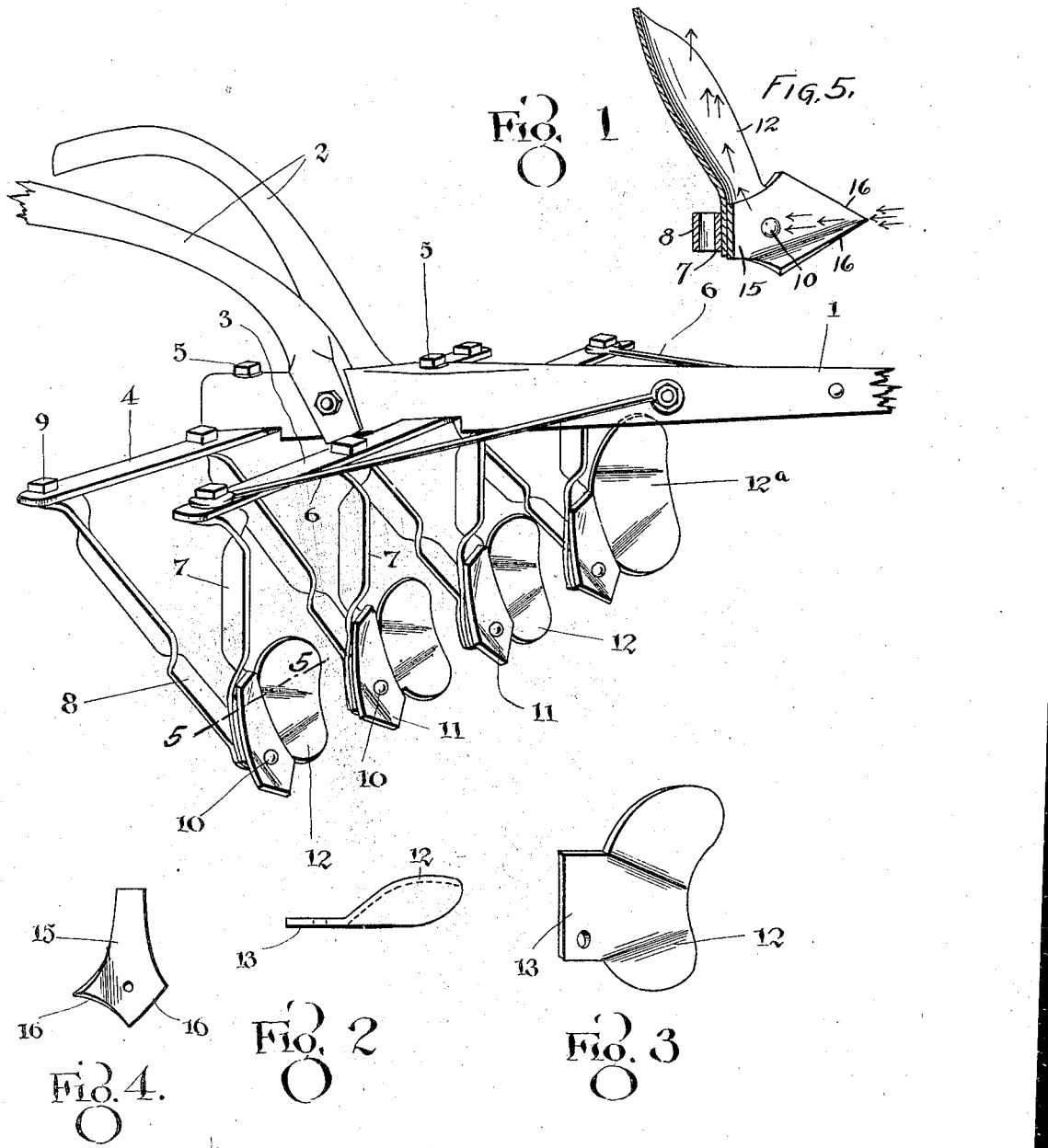

1,472,728

UNITED STATES PATENT OFFICE.

JAMES EDWARD McNEIL, OF MEMPHIS, TENNESSEE.

PLOW.

Application filed October 8, 1920. Serial No. 415,621.

*To all whom it may concern:*

Be it known that I, JAMES EDWARD MC-NEIL, a citizen of the United States, and a resident of Memphis, in the county of Shelby and State of Tennessee, have invented certain new and useful Improvements in Plows, of which the following is a specification.

My invention is an improvement in plows, and has for its object to provide a plow construction especially adapted for cotton cultivation for simplifying such cultivation and reducing the amount of time and labor required to complete the working.

In the drawings:

Figure 1 is a perspective view of one improved plow,

Figure 2 is a top plan view of a share,

Figure 3 is a perspective view.

Figure 4 is a front view of a plow tooth.

Fig. 5 is a horizontal sectional view on line 5—5 of Fig. 1.

As is known, in cotton cultivation in the usual manner, before hoeing, the dirt is thrown away from the cotton this operation requiring two furrows. Afterwards the balk formed by these two furrows is broken out, this requiring another furrow. The row is then leveled for plowing, requiring in all five furrows in every row to complete the working. With the present construction, the entire working is accomplished with two furrows for each operation, thus more than doubling the acreage that may be cultivated by, for instance, one man and one mule.

In the present embodiment of the invention the improved plow comprises a beam 1 of usual construction, having connected therewith a pair of handles 2, the said handles being at the rear end of the beam, and suitable draft mechanism may be connected with the front end of the beam. A pair of plates 3 and 4 is arranged transversely of the rear end of the beam, the plate 3 being in front of the handles, while the plate 4 is in rear of the handles. These plates are secured to the beam in any suitable manner, as indicated at 5, and the plate 3 is braced against the beam by means of braces 6. A series of standards 7 depends from the plate 3, four standards being provided in the present instance, and each of these standards is composed of strap metal having an angular portion at its top which is bolted to the plate. Intermediate its upper and lower ends, the material of each standard is given a quarter-turn as clearly shown in Figure 1, so that between the plow to be described and the plate 3 the standard presents itself edgewise.

Each of these standards 7 is braced against the plate 4 by means of a brace 8, each of the said braces 8 being secured at one end to the plate 4 as indicated at 9, and being connected at the other end by means of a bolt 10 to the standard, and to the plow and share or wing to be described. Each of these plows 11 as clearly shown is composed of a plate of suitable size, and of approximately diamond shaped. Each of these plates has its lower end pointed as shown to provide a cutting edge, and it is of greatest width adjacent to this point, gradually decreasing in width toward its upper end.

That is, each plow is composed of a plate of greatest width near one end and having the the said end pointed, and gradually decreasing in width toward the opposite end. The wide end of the plow being downward, there is no resistance offered to the passage of dirt thrown upward by the plow, the dirt passing on each side of the plate toward the rear. A wing or share is arranged adjacent to each plow. The wings or shares 12 adjacent to the plows at the right of the plates 11 are alike, each being in the form of a plate having its corners rounded and curved from above downward, the concaved faces of the wing being forward. Each of these plates has an extension 13 which is received between the adjacent plow and standard, and has an opening near the bottom for engagement by the adjacent bolt 10. That share or wing 12ª which is at the left end of the plate 3 is of larger size than the shares 12, being of greater area as clearly shown in Figure 1. The point of each tooth or plow 11 is bent at an angle or twisted forwardly at the right hand side with respect to the general plane of the plow so that the dirt is thrown toward the wing. In practice plow points of different size will be provided for use with cotton of different height.

In practice three sizes of points will be used, one for small cotton, one for large cotton, and one for medium cotton. Three sizes of wings are also provided varying with the size of the plow points, the larger wings being used with the larger plows. All of the wings have their upper ends bent forwardly, to choke the flow of dirt up the wing, and to constrain the dirt to move laterally away from the plate.

In plowing when the soil moves straight up the wing it will fall over and cover the plants. When thrown laterally however it does not fall upon the plants. Obviously the wings 12 may be used either straight or curved as shown, and with large cotton it is not necessary to bend the wings at the top, since the plants cannot be covered up. With the improved plow but two furrows are required at each working, and while the soil is thoroughly stirred and all weeds eliminated, the soil is evenly distributed, so that it is not necessary to break balks nor to side harrow when replowing. Two plowings only are necessary for each working and one man and one mule can cultivate a larger acreage than two men and two mules with the usual manner of work.

It will be evident that the improved plow thoroughly cultivates all of the soil, moving the soil away from the plants when arranged to do so, but leveling the soil, instead of heaping it at the center between the rows.

The present plow performs the operation of dirting or throwing the dirt back around the cotton (usually done by two furrows with a shovel plow) and also the operation of cleaning the balance of the row (usually done by one furrow with a middle burster followed by two more with a side harrow to drag down the high bed) all in two furrows to each row.

In Figure 4 there is shown a plow tooth or point 15 especially designed for use with the frame shown in Figure 1. This plow as shown is of widest dimension near its point, and decreases in width rapidly toward the top. The laterally projecting points 16 serve to span the space between the teeth to prevent grass slipping through between the teeth, and to pick up all the dirt possible.

I claim:

A plow comprising a standard, a share arranged at the forward side of the standard, a wing arranged at one side of the share and having an attaching plate arranged between the share and the standard, and a fastening device connecting the share and the attaching plate to said standard, said wing having its upper and lower portions curved forwardly and rounded, the outer longitudinally extending edge of said wing being curved inwardly between its ends for the passage of dirt.

JAMES EDWARD McNEIL.